US012616078B2

(12) United States Patent (10) Patent No.: US 12,616,078 B2
Hodel et al. (45) Date of Patent: May 5, 2026

(54) AGRICULTURAL IMPLEMENTS AND METHODS OF PLANTING

(71) Applicant: Precision Planting LLC, Tremont, IL (US)

(72) Inventors: Jeremy Hodel, Morton, IL (US); Justin McMenamy, Edwards, IL (US); Dale Koch, Tremont, IL (US); Luke Stuber, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 908 days.

(21) Appl. No.: 17/629,756

(22) PCT Filed: Jun. 17, 2020

(86) PCT No.: PCT/IB2020/055642
§ 371 (c)(1),
(2) Date: Jan. 24, 2022

(87) PCT Pub. No.: WO2021/014231
PCT Pub. Date: Jan. 28, 2021

(65) Prior Publication Data
US 2022/0272888 A1 Sep. 1, 2022

Related U.S. Application Data

(60) Provisional application No. 62/877,943, filed on Jul. 24, 2019.

(51) Int. Cl.
*A01B 63/00* (2006.01)
*A01C 5/06* (2006.01)
*A01C 7/08* (2006.01)

(52) U.S. Cl.
CPC ............ *A01B 63/008* (2013.01); *A01C 5/064* (2013.01); *A01C 7/08* (2013.01)

(58) Field of Classification Search
CPC ..... A01B 63/008; A01B 63/00; A01B 63/002; A01C 5/064; A01C 5/06; A01C 5/066; A01C 5/068; A01C 7/08
See application file for complete search history.

(56) References Cited

U.S. PATENT DOCUMENTS 4,422,392 A * 12/1983 Dreyer .................. A01C 7/006
172/674
6,701,857 B1 3/2004 Jensen et al.
(Continued)

FOREIGN PATENT DOCUMENTS

EP 0171719 A2 2/1986
GB 2022983 A1 12/1979
(Continued)

OTHER PUBLICATIONS

European Patent Office, International Search Report related to International Patent Application No. PCT/IB2020/055642, mail date Sep. 16, 2020.
(Continued)

*Primary Examiner* — Jamie L McGowan

(57) ABSTRACT

An agricultural implement includes a row unit frame (202) coupled to a draw bar (204) by a height-adjustable mount, a set of opening discs (212) coupled to the row unit frame such that the opening discs are vertically fixed relative to the row unit frame, and a biasing member (210) configured to adjust a height of the row unit frame to maintain the opening discs in soil at a selected elevation relative to the draw bar. A method of planting may include determining a height of a draw bar relative to a surface of soil, and adjusting a height of the row unit frame relative to the draw bar to apply a force to push a seed trench opening assembly into the soil and form a trench therein. The height of the row unit frame relative to the draw bar may be independent of the hardness of the soil.

22 Claims, 7 Drawing Sheets

(56)                 References Cited

U.S. PATENT DOCUMENTS

| 9,408,337 | B2 | | 8/2016 | Sauder et al. | |
| 9,750,174 | B2 | | 9/2017 | Sauder et al. | |
| 9,848,524 | B2 | | 12/2017 | Sauder et al. | |
| 9,864,094 | B2 | | 1/2018 | Stoller et al. | |
| 9,961,822 | B2 | | 5/2018 | Sauder et al. | |
| 10,444,176 | B2 | * | 10/2019 | Puhalla | A01B 47/00 |
| 10,512,212 | B2 | * | 12/2019 | Koch | G01K 1/16 |
| 10,820,490 | B2 | * | 11/2020 | Schoeny | A01C 7/205 |
| 11,116,123 | B2 | * | 9/2021 | Schoeny | A01C 7/203 |
| 11,202,404 | B2 | | 12/2021 | Walter et al. | |
| 2014/0041351 | A1 | | 2/2014 | Bollin et al. | |
| 2015/0264857 | A1 | * | 9/2015 | Achen | A01B 63/32 |
| | | | | | 172/260.5 |
| 2015/0271986 | A1 | | 10/2015 | Sauder et al. | |
| 2015/0313076 | A2 | | 11/2015 | Sauder et al. | |
| 2016/0157412 | A1 | | 6/2016 | Sauder et al. | |
| 2016/0165789 | A1 | | 6/2016 | Gervais et al. | |
| 2016/0338260 | A1 | | 11/2016 | Hahn | |
| 2017/0094894 | A1 | | 4/2017 | Heim et al. | |
| 2017/0359945 | A1 | | 12/2017 | Sauder et al. | |
| 2018/0116100 | A1 | | 5/2018 | Sauder et al. | |
| 2018/0255694 | A1 | | 9/2018 | Sauder et al. | |
| 2019/0014714 | A1 | | 1/2019 | Swanson et al. | |
| 2019/0075710 | A1 | | 3/2019 | Strnad et al. | |
| 2019/0075714 | A1 | | 3/2019 | Koch et al. | |
| 2019/0110388 | A1 | * | 4/2019 | Gresch | A01C 7/20 |
| 2019/0124824 | A1 | | 5/2019 | Hubner et al. | |
| 2019/0159398 | A1 | * | 5/2019 | McMenamy | A01C 23/028 |
| 2019/0186911 | A1 | * | 6/2019 | do Amaral Assy | A01C 7/102 |
| 2020/0236843 | A1 | | 7/2020 | Graham et al. | |
| 2020/0281111 | A1 | | 9/2020 | Walter et al. | |

FOREIGN PATENT DOCUMENTS

| WO | | 2017197274 | A1 | | 11/2017 | |
| WO | WO-2018109545 | A1 | * | 6/2018 | | A01B 63/114 |
| WO | | 2019157521 | A1 | | 8/2019 | |

OTHER PUBLICATIONS

UK Intellectual Property Office, Search report for related UK Application No. GB1911336.4, dated Feb. 6, 2020.

* cited by examiner

Select Depth of Trench to Be Formed ⟶ 302

Determine Height of Frame With Respect to Soil Surface ⟶ 304

Adjust Height of Frame With Respect to Draw Bar to Apply Force to Seed Trench Opening Assembly Into Soil and Form Trench ⟶ 306

AGRICULTURAL IMPLEMENTS AND METHODS OF PLANTING

CROSS-REFERENCE TO RELATED APPLICATIONS

This application claims the benefit of the filing date of U.S. Provisional Patent Application 62/877,943, "Agricultural Implements and Methods of Planting," filed Jul. 24, 2019, the entire disclosure of which is incorporated herein by reference.

FIELD

Embodiments of the present disclosure relate to implements and methods of planting agricultural fields. More particularly, embodiments of the present disclosure relate to controlling depth at which seeds are planted.

BACKGROUND

Crop yields are affected by a variety of factors, such as seed placement, soil quality, weather, irrigation, and nutrient applications. Seeds are typically planted in trenches formed by discs or other mechanisms of a planter row unit. Depth of seed placement is important because seeds planted at different depths emerge at different times, resulting in uneven crop growth. Trench depth can be affected by soil type, moisture level, row unit speed, and operation of the opening discs. It would be beneficial to have improved methods of controlling the depth of trenches so that seeds can be more precisely placed in a field.

BRIEF SUMMARY

In some embodiments, an agricultural implement includes a row unit frame coupled to a draw bar by a height-adjustable mount, a set of opening discs coupled to the row unit frame such that the opening discs are vertically fixed relative to the row unit frame, and a biasing member configured to adjust a height of the row unit frame to maintain the opening discs in soil at a selected elevation relative to the draw bar.

An agricultural implement may include a toolbar, a row unit pivotally coupled to the toolbar, a sensor configured to measure a height of the toolbar relative to the ground surface, and an actuator configured to adjust a height of the row unit relative to the toolbar. The row unit includes a row unit frame, a seed trench opening assembly coupled to the row unit frame and configured to form a trench in a ground surface, a firming device disposed at a variable height relative to the row unit frame, and a seed delivery mechanism coupled to the row unit frame and configured to provide seeds to the trench. The actuator controls a penetration depth of the seed trench opening assembly in the ground surface.

Methods of planting may include selecting a depth of a trench to be formed in soil, determining a height of a row unit frame relative to a surface of the soil, and adjusting a height of the row unit frame relative to a draw bar. The row unit frame is coupled to the draw bar by a vertically adjustable mount, and the row unit frame carries a seed trench opening assembly. The height of the row unit frame relative to the draw bar is independent of hardness of the soil. The methods may further include applying a force to push the seed trench opening assembly into the soil and form a trench therein.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
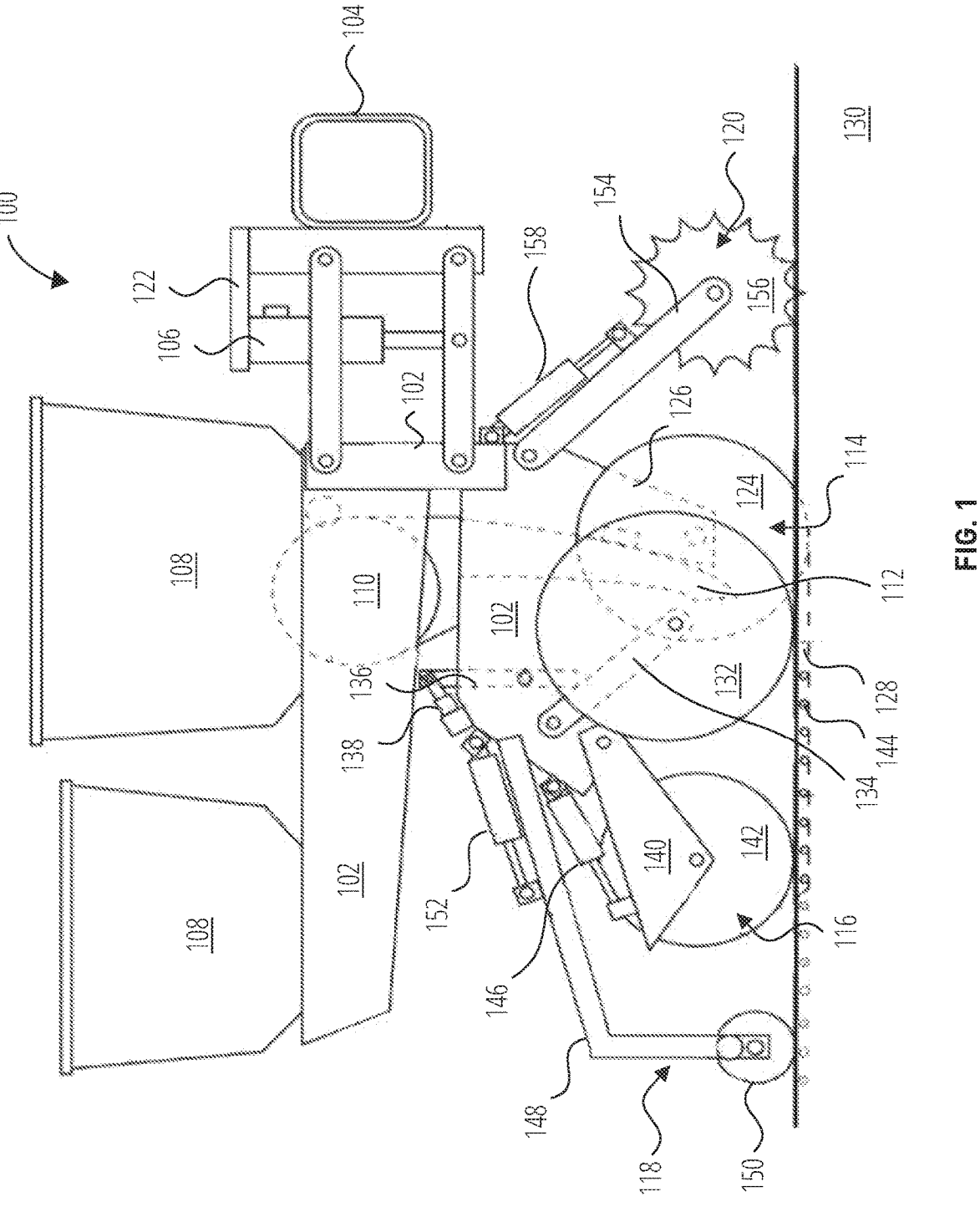
FIG. 1 is a simplified side view of a row unit for planting that may be operated as disclosed herein.

The illustrations presented herein are not actual views of any planter or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an embodiment of an agricultural planter row unit 100. The row unit 100 has a row unit frame 102 pivotally connected to a toolbar 104 by a parallel linkage 106 enabling each row unit 100 to move vertically independently of the toolbar 104. The row unit frame 102 may be a unitary member, or may include one or more members coupled together (e.g., by bolts, welds, etc.). The row unit frame 102 shown includes three connected members. The row unit frame 102 operably supports one or more hoppers 108, a seed meter 110, a seed delivery mechanism 112, a seed trench opening assembly 114, a trench closing assembly 116, a packer wheel assembly 118, and a row cleaner assembly 120. It should be understood that the row unit 100 shown in FIG. 1 may be for a conventional planter or the row unit 100 may be a central fill planter, in which case the hoppers 108 may be replaced with one or more mini-hoppers and the row unit frame 102 modified accordingly as would be recognized by those of skill in the art.

A downforce control system 122 is disposed to apply lift and/or downforce on the row unit frame 102 to control the height of the row unit 100 relative to the toolbar 104, such as disclosed in U.S. Pat. No. 9,408,337, "Agricultural row unit apparatus, systems and methods," granted Aug. 9, 2016.

The seed trench opening assembly 114 includes a pair of opening discs 124 rotatably supported by a portion of the row unit frame 102 at a fixed point, which may be in the form of a downwardly extending shank 126. The opening discs 124 are arranged to diverge outwardly and rearwardly so as to open a V-shaped trench 128 in the soil 130 as the planter traverses the field. The seed delivery mechanism 112, which may be a seed tube or seed conveyor, is positioned between the opening discs 124 to deliver seed from the seed meter 110 into the opened trench 128. The seed trench opening assembly 114 may also include a pair of gauge wheels 132 following the opening discs 124 and the seed delivery mechanism 112. The gauge wheels 132 are rotatably supported by gauge wheel arms 134, which are pivotally secured at one end to the row unit frame 102 about pivot pin. A rocker arm 136 is pivotally supported on the row unit frame 102 by a pivot pin. It should be appreciated that rotation of the rocker arm 136 about the pivot pin limits the upward travel of the gauge wheel arms 134 (and thus the gauge wheels 132) relative to the opening discs 124, thus limiting the depth at which the opening discs 124 may open the trench 128. The rocker arm 136 may be adjustably positioned via an actuator 138 mounted to the row unit frame 102 and pivotally coupled to an upper end of the rocker arm 136. The actuator 138 may be controlled remotely or may be automatically actuated as disclosed, for example, in U.S. Pat. No. 9,864,094, "System for soil moisture monitoring," issued Jan. 9, 2018.

The seed meter 110 may be any commercially available seed meter, such as a finger-type meter or vacuum seed meter, such as the VSet® meter, available from Precision Planting LLC, of Tremont, Illinois.

The trench closing assembly 116 includes a closing wheel arm 140 which pivotally attaches to the row unit frame 102. A pair of offset closing wheels 142 are rotatably attached to the closing wheel arm 140 and are angularly disposed to "close" the trench 128 by pushing the walls of the trench 128 back together over seeds 144 deposited by the seed delivery mechanism 112.

An actuator 146 may be pivotally attached at one end to the closing wheel arm 140 and at its other end to the row unit frame 102 to vary the down pressure exerted by the offset closing wheels 142, depending on soil conditions or other factors. The trench closing assembly 116 may be of the type disclosed in U.S. Pat. No. 9,848,524, "Agricultural seed trench closing systems, methods and apparatus," issued Dec. 26, 2017.

The packer wheel assembly 118 comprises an arm 148 pivotally attached to the row unit frame 102 and extends rearward of the trench closing assembly 116 and in alignment therewith. The arm 148 rotatably supports a packer wheel 150. An actuator 152 is pivotally attached at one end to the arm 148 and at its other end to the row unit frame 102 to vary the amount of downforce exerted by the packer wheel 150 to pack the soil over the trench 128.

The row cleaner assembly 120 may be the CleanSweep® system available from Precision Planting LLC, of Tremont, Illinois. The row cleaner assembly 120 includes an arm 154 pivotally attached to the forward end of the row unit frame 102 and aligned with the seed trench opening assembly 114. A pair of row cleaner wheels 156 is rotatably attached to the forward end of the arm 154. An actuator 158 is pivotally attached at one end to the arm 154 and at its other end to the row unit frame 102 to adjust the downforce on the arm 154 to vary the aggressiveness of the action of the row cleaner wheels 156, depending on the amount of crop residue and soil conditions.

Figure 2:
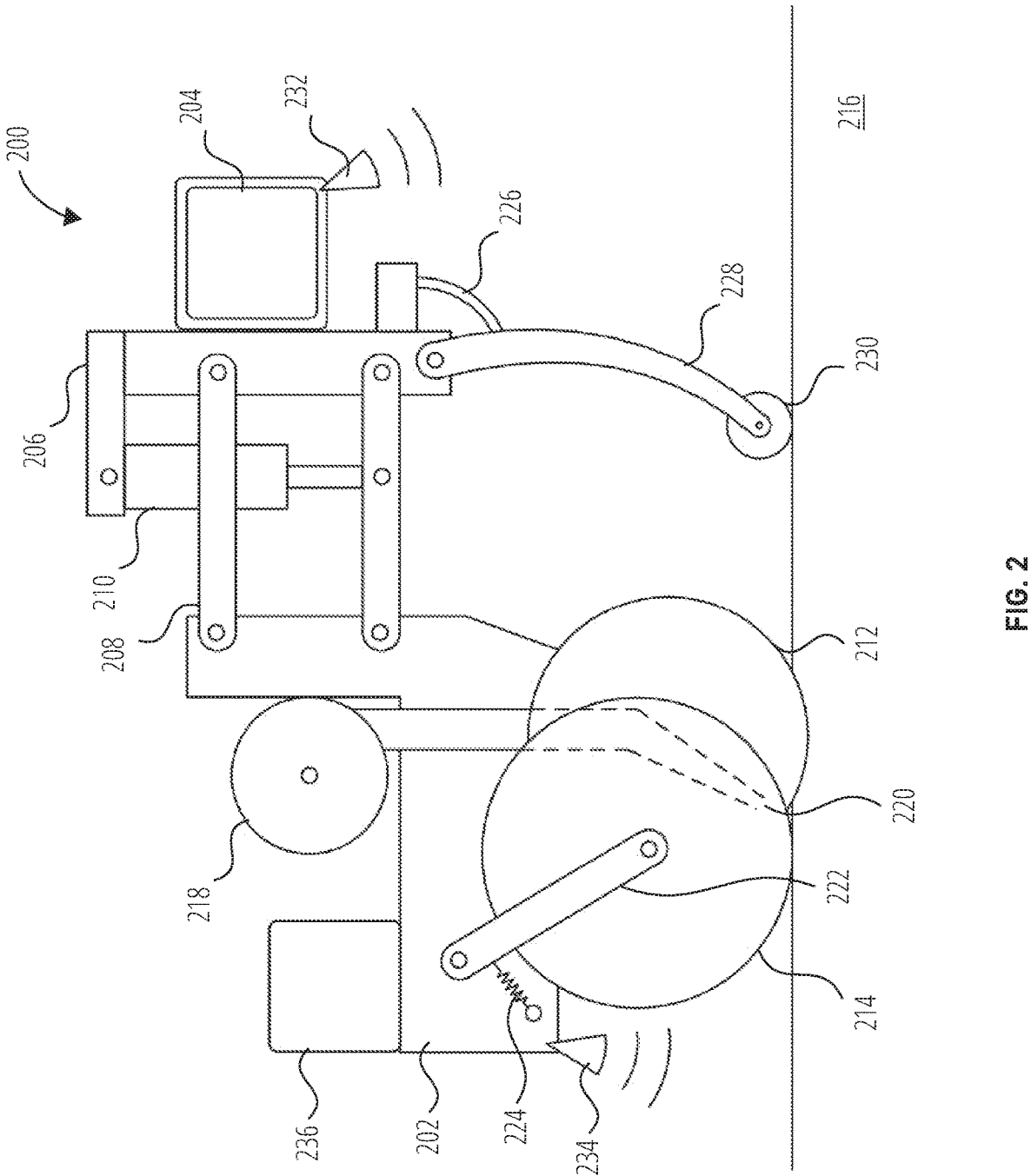
FIG. 2 illustrates another row unit in accordance with one embodiment.

FIG. 2 is a simplified view of another embodiment of a row unit 200. The row unit 200 includes a row unit frame 202 coupled to a draw bar 204 of an agricultural implement by a height-adjustable mount that includes a fixed portion 206 and parallel links 208. The draw bar 204 may be configured to be pulled by a tractor or another machine. The height of the row unit frame 202 relative to the draw bar 204 may be controlled by an actuator 210 connected to the parallel links 208 and the fixed portion 206 (or to the parallel links 208 and the row unit frame 202). For example, the actuator 210 may be a hydraulic actuator, a pneumatic actuator, or an electric actuator.

The row unit frame 202 shown in FIG. 2 carries at least one set of wheels, such as opening discs 212 and firming wheels 214 (typically two of each, of which only one of each appears in FIG. 2). In operation, the opening discs 212 pivot about an axis attached to the row unit frame 202 and form a trench in the soil 216. Seeds are provided to the trench by a seed meter 218 via a seed tube 220 carried by the row unit frame 202. The firming wheels 214 follow the seed tube 220, and may press downward on the seeds and/or move the soil 216 to close the trench and cover the seeds.

The firming wheels 214 are connected to the row unit frame 202 by one or more pivoting arms 222. The firming wheels 214 may therefore travel vertically upward and downward as the row unit 200 travels through a field. That is, the firming wheels 214 may be disposed at a variable height relative to the row unit frame 202. A biasing member 224 may apply a force to press the firming wheels 214 against the surface of the soil 216 independent of the elevation of the surface of the soil 216. That is, the biasing member 224 may be configured to provide a predetermined force, rather than to keep the firming wheels 214 at a specific height. Furthermore, in some embodiments, the biasing member 224 may be configurable to accommodate variable field conditions. For example, the biasing member 224 may be adjusted by a T-handle manual adjustment, a hydraulic actuator, a pneumatic actuator, an electric actuator, or another biasing member. The biasing member 224 may be adjusted manually (e.g., before a planting operation) or automatically (e.g., by a computer in the cab of tractor). The biasing member 224 is depicted in FIG. 2 as a spring, but may alternatively be a hydraulic actuator, a pneumatic actuator, an electric actuator, or another biasing member. The biasing member 224 may be passive (e.g., a spring) or controlled by a control system (e.g., an actuator).

The opening discs 212 may be connected to the row unit frame 202 by a pin or axle, or may be connected by an arm as described relative to the firming wheels 214.

The fixed portion 206 of the height-adjustable mount may also carry a wheel 230 connected by an arm 228. The wheel 230 may be configured to contact the surface of the soil 216. An angle sensor 226 (e.g., a rotary potentiometer or Hall-effect sensor) may detect the angle of the arm 228 relative to the height-adjustable mount, and may translate this angle into a signal (e.g., an electrical or pneumatic signal) that can be correlated with the height of the draw bar 204 from the surface of the soil 216. The position of the row unit frame 202 in relation to the fixed portion 206 of the height-adjustable mount may be determined by a sensor integrated with the actuator 210, or as otherwise known in the art.

The row unit 200 may also include one or more non-contact depth sensors, such as depth sensor 232 and depth sensor 234. The depth sensor 232 may be directed to lead the opening discs 212 and detect the soil 216 that has not yet been worked by the row unit 200. The depth sensor 232 is shown attached to the draw bar 204, but may alternatively be attached to the fixed portion 206 of the height-adjustable mount. The depth sensor 232 may measure the height of the draw bar 204 relative to the surface of the soil 216, and may therefore be used instead of or as a supplement to the angle sensor 226 and wheel 230 described above. The depth sensor 234 may be directed to follow the firming wheels 214 and detect the soil 216 that has been worked by the row unit 200. The depth sensor 234 is shown attached to the row unit frame 202, and may measure the height of the row unit frame 202 relative to the surface of the soil 216.

The row unit 200 may include a processor 236 configured to communicate with one or more of the angle sensor 226, the depth sensor 232, the depth sensor 234, the actuator 210, or the biasing member 224. In some embodiments, the processor 236 may be configured to direct the actuator 210 to adjust the position of the parallel links 208 (and therefore the height of the row unit frame 202 and the opening discs 212) based on the sensed height of the ground ahead of the row unit 200 (from the depth sensor 232 or the angle sensor 226). The sensed height of the ground behind the row unit 200 (e.g., from the depth sensor 234 or a sensor as described in U.S. Patent Application Publication 2019/0075710, "Seed Trench Depth Detection Systems," published Mar. 14, 2019) may be used to confirm that the opening discs 212 and firming wheels 214 operate as expected.

In some embodiments, the sensed height of the ground behind the row unit 200 may be used to adjust the height of the row unit frame 202, but that method would not detect contours of the ground until after the opening discs 212 had passed. Thus, this mode may be more useful for planting in ground having gentle slope changes than in ground having a large number of ridges and valleys.

Figure 5:
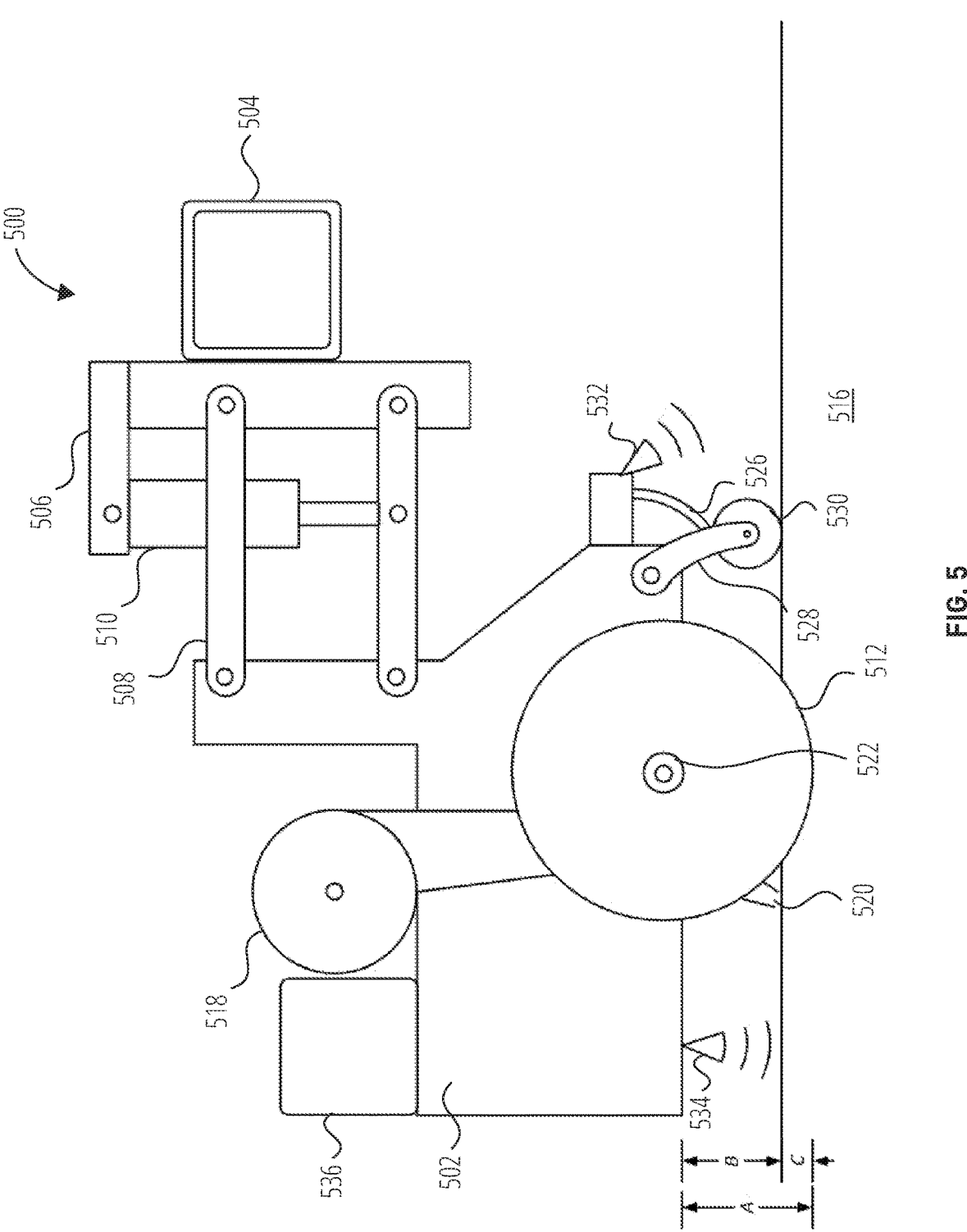
FIG. 5 illustrates another row unit in accordance with one embodiment.

FIG. 5 is a simplified view of another embodiment of a row unit 500. The row unit 500 includes a row unit frame 502 coupled to a draw bar 504 of an agricultural implement by a height-adjustable mount that includes a fixed portion 506 and parallel links 508. The draw bar 504 may be configured to be pulled by a tractor or another machine. The height of the row unit frame 502 relative to the draw bar 504 may be controlled by an actuator 510 connected to the parallel links 508 and the fixed portion 506 (or to the parallel links 508 and the row unit frame 502). For example, the actuator 510 may be a hydraulic actuator, a pneumatic actuator, or an electric actuator.

The row unit frame 502 shown in FIG. 5 carries opening discs 512. In operation, the opening discs 512 form a trench in the soil 516. Seeds are provided to the trench by a seed meter 518 via a seed tube 520 carried by the row unit frame 502.

The opening discs 512 are connected to the row unit frame 502 at a pivot point 522 (e.g., an axle). The opening discs 512 are therefore fixed vertically relative to the row unit frame 502, and rotate as the row unit 500 travels through a field.

The row unit frame 502 may also carry a wheel 530 connected by an arm 528. The wheel 530 may be configured to contact the surface of the soil 516. An angle sensor 526 (e.g., a rotary potentiometer or Hall-effect sensor) may detect the angle of the arm 528 relative to the height-adjustable mount, and may translate this angle into a signal (e.g., an electrical or pneumatic signal) that can be correlated with the height of the row unit frame 502 from the surface of the soil 516. Thus, the penetration depth of the opening discs may be set without the use of gauge wheels.

The row unit 500 may also include one or more depth non-contact sensors, such as depth sensor 532 and depth sensor 534. The depth sensor 532 may be directed to lead the opening discs 512 and detect the soil 516 that has not yet been worked by the row unit 500. The depth sensor 532 is shown attached to the row unit frame 502. The depth sensor 532 may be used instead of or as a supplement to the angle sensor 526 and wheel 530 described above. The depth sensor 534 may be directed to follow the opening discs 512 and detect the soil 516 that has been worked by the row unit 500.

The row unit 500 may include a processor 536 configured to communicate with one or more of the angle sensor 526, the depth sensor 532, the depth sensor 534, or the actuator 510. In some embodiments, the processor 536 may be configured to direct the actuator 510 to adjust the position of the parallel links 508 (and therefore the height of the row unit frame 502 and the opening discs 512) based on the sensed height of the ground ahead of the row unit 500 (from the depth sensor 532 or the angle sensor 526). The sensed height of the ground behind the row unit 500 (i.e., from the depth sensor 534) may be used to confirm that the opening discs 512 operate as expected.

In some embodiments, the sensed height of the ground behind the row unit 500 may be used to adjust the height of the row unit frame 502, but that method would not detect contours of the ground until after the opening discs 512 had passed. Thus, this mode may be more useful for planting in ground having gentle slope changes than in ground having a large number of ridges and valleys.

For example, the sensor 534 may measure the distance (B) from the bottom of the row unit frame 502 to the surface of the soil 516. If the distance (A) from the row unit frame 502 to the deepest extent of the opening discs 512 is known, the depth (C) of the trench can be calculated. In other embodiments, the distance (A) may be calculated by measuring the angle of the arm 528 in relation to the row unit frame 502 using the angle sensor 526. In some embodiments, one or more of the distances may be measured by a Hall-Effect sensor, as described in U.S. Pat. No. 9,750,174, "Agricultural trench depth sensing systems, methods, and apparatus," issued Sep. 5, 2017; or any other sensor, such as those described in U.S. Patent Application Publication 2019/0075710, "Seed Trench Depth Detection Systems," published Mar. 14, 2019; and U.S. Patent Application Publication 2019/0014714, "Agricultural Trench Depth Systems, Methods, and Apparatus," published Jan. 17, 2019.

Figure 6:
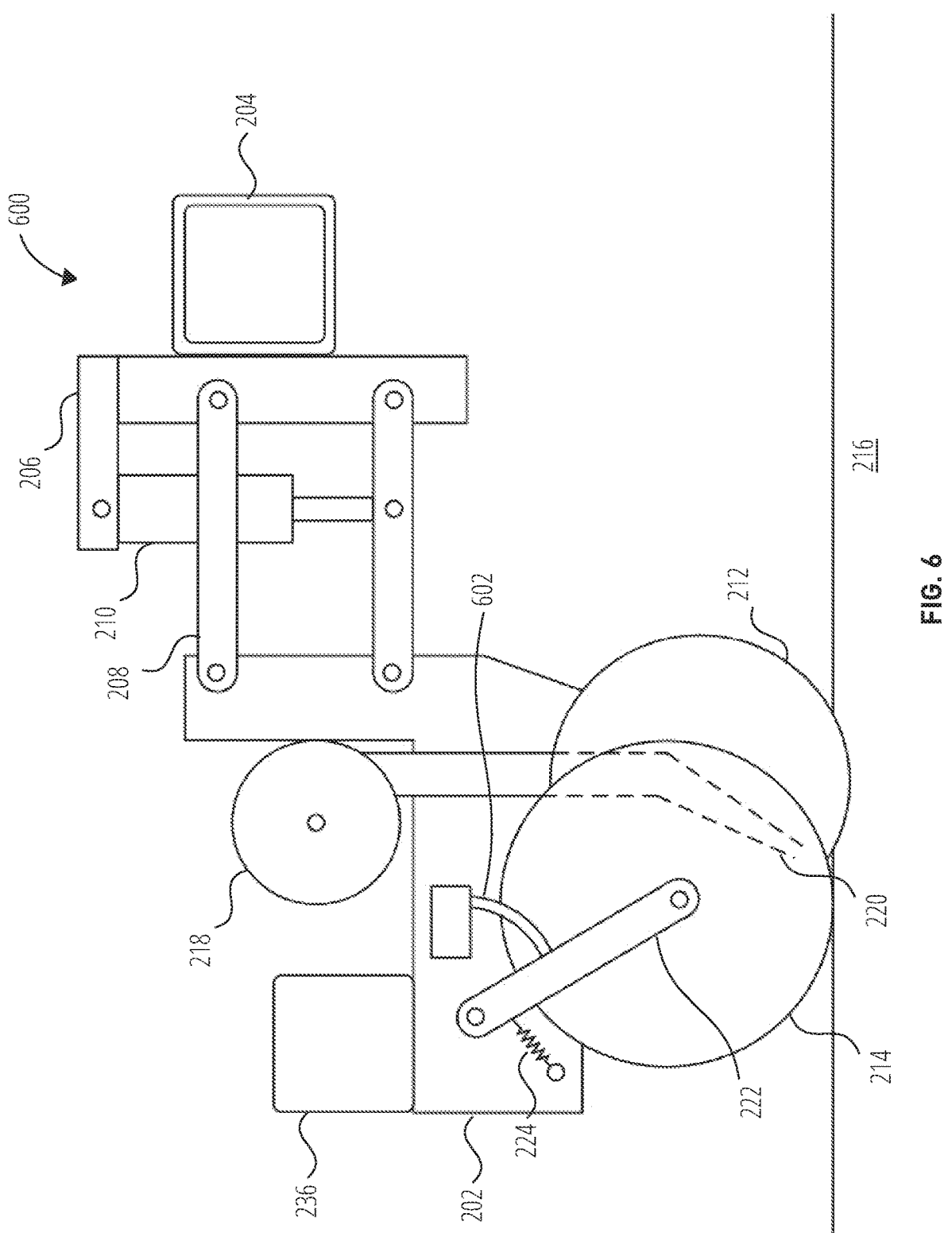
FIG. 6 illustrates another row unit in accordance with another embodiment.

FIG. 6 is a simplified view illustrating another row unit 600, which is similar to the row unit 200 (FIG. 2) in that it includes firming wheels 214 pivotally connected to the row unit frame 202 arms 222. While a biasing member 224 keeps firming wheels 214 in contact with the soil 216, one or more angle sensors 602 measure the position of the arms 222 and/or the firming wheels 214. The processor 236 may be configured to adjust the position of the parallel links 208 (and therefore the height of the row unit frame 202 and the opening discs 212) based on the position of the firming wheels 214.

Figure 7A:
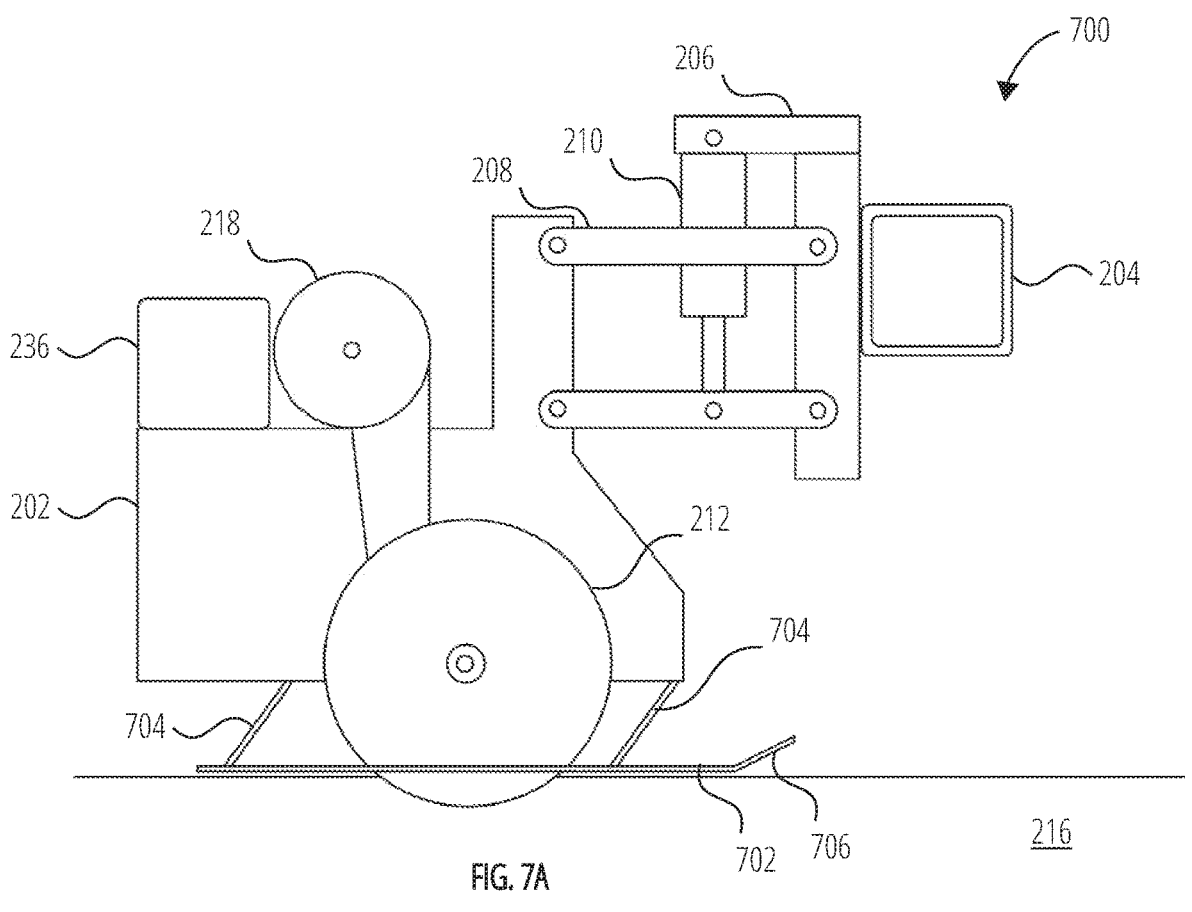
FIG. 7A is a side view of another row unit in accordance with yet another embodiment.
Figure 7B:
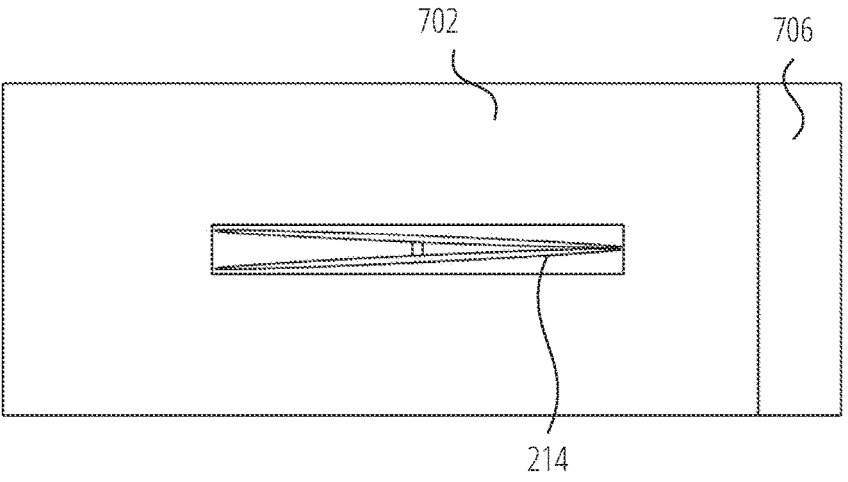
FIG. 7B is a top view of a firming plate shown in the embodiment of FIG. 7A.

FIG. 7A is a simplified side view illustrating another row unit 700, which is similar to the row unit 606, but which includes a firming plate 702 rather than firming wheels 214. The firming plate 702 may be connected to the row unit frame 202 by biasing members 704, and may be configured such that the row unit frame 202 and the biasing members 704 press the firming plate 702 against the soil 216. The firming plate 702 may be configured to travel vertically relative to the row unit frame 202. The firming plate 702 may include a tapered lip 706 to keep the firming plate 702 on top of the surface of the soil 216 (i.e., in a manner similar to how a ski stays on top of snow or water). FIG. 7B shows a top view of the firming plate 702. The firming plate 702 may partially or entirely surround the opening wheels 212. The opening wheels 212 and the firming plate 702 may work together to cleanly open a trench in the soil 216 for planting. One or more sensors, such as those depicted in FIGS. 3, 5, and 6, may detect the position of the firming plate 702 by measuring the distance between the firming plate 702 and the row unit frame 202, measuring the angle of the biasing members 704 relative to the row unit frame 202 and/or the firming plate 702, or by any other means.

Figure 3:
FIG. 3 is a simplified flowchart illustrating a method of operating a row unit.
Figure 3:
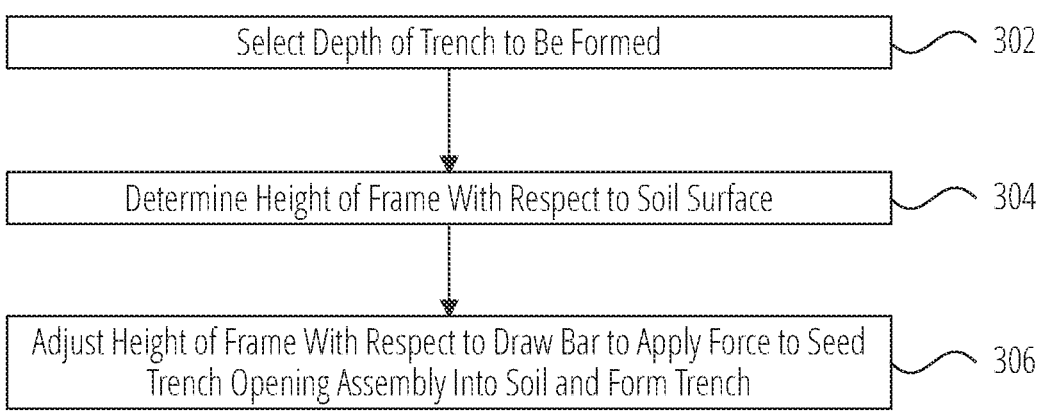

FIG. 3 is a simplified flow chart illustrating a method 300 in which a row unit (e.g., the row unit 100 in FIG. 1 or the row unit 200 in FIG. 2) may be used in a field.

As depicted in block 302, the method 300 includes selecting a target depth of a trench to be formed in soil. The target depth may selected to be uniform throughout an entire field, may be based on a preset prescription map, a field measurement, a user input, etc.

Block 304 depicts determining a height of a row unit frame relative to a surface of soil. The row unit frame is part of a row unit and coupled to a draw bar by a vertically adjustable mount. The row unit frame carries a seed trench opening assembly. The height may be sensed with one or more sensors carried by the draw bar and/or the row unit. In some embodiments, the height may be calculated based on two or more measurements, or based on one in-situ measurement and a known distance. In other embodiments, the height may be measured directly. The height may then be compared with the target depth.

In block 306, the method 300 includes adjusting a height of the row unit frame relative to the draw bar. The height may be adjusted by moving a parallel linkage, such as by operating a controller in the cab of a tractor pulling the draw bar.

Adjusting the height of the row unit frame may cause application of a force to push the seed trench opening assembly into the soil and form a trench therein. The seed trench opening assembly is vertically fixed relative to the row unit frame.

Figure 4:
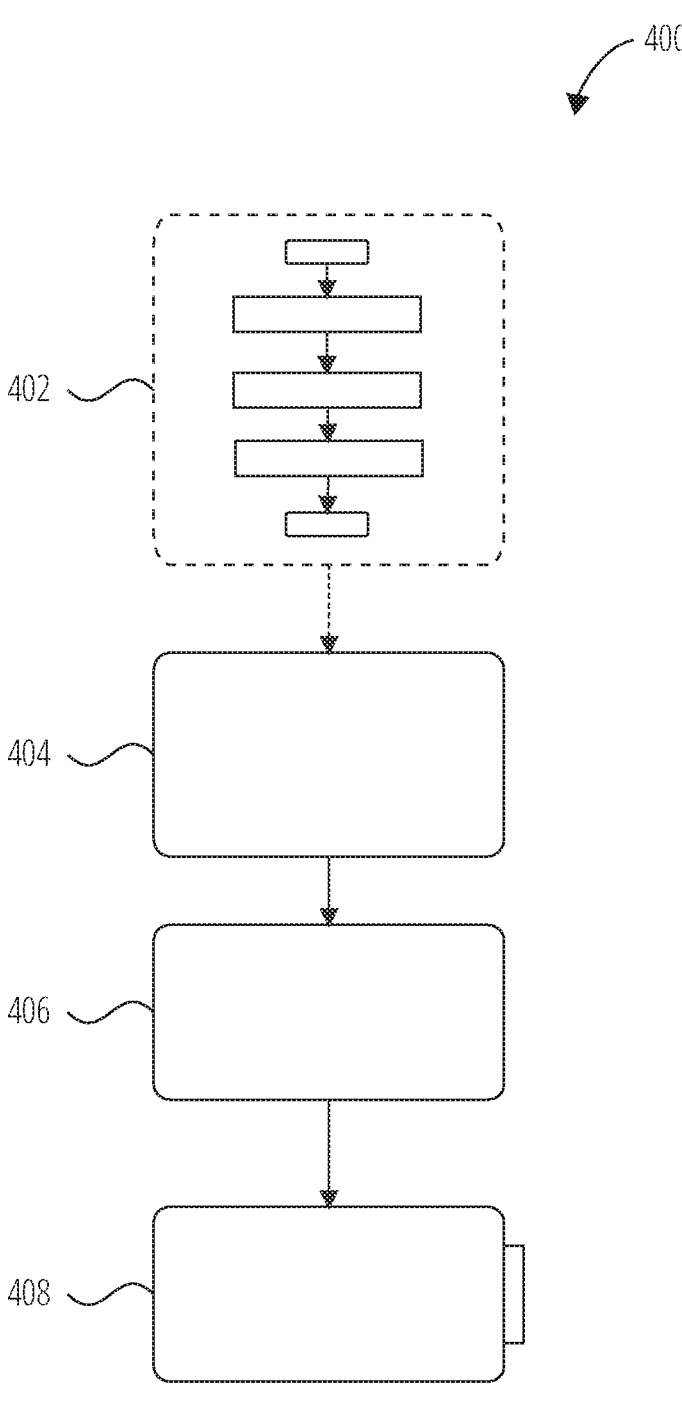
FIG. 4 illustrates an example computer-readable storage medium comprising processor-executable instructions configured to embody one or more of the methods of operating row units, such as the method illustrated in FIG. 3.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 4, wherein an implementation 400 includes a computer-readable storage medium 402 (e.g., a flash drive, CD-R, DVD-R, application-specific integrated circuit (ASIC), field-programmable gate array (FPGA), a platter of a hard disk drive, etc.), on which is computer-readable data 404. This computer-readable data 404 in turn includes a set of processor-executable instructions 406 configured to operate according to one or more of the principles set forth herein. In some embodiments, the processor-executable instructions 406 may be configured to cause a computer to perform operations 408 when executed via a processing unit, such as at least some of the example method 300 depicted in FIG. 3. Many such computer-readable media may be devised by those of ordinary skill in the art that are configured to operate in accordance with one or more of the techniques presented herein.

The implements and methods disclosed herein may benefit a farmer by helping to control planting depth based on different field conditions. Different areas within the field may be planted using different depth settings, and sensors may be used to select an appropriate depth at different locations. Furthermore, if adjusting the depth is automated in a computer, the changes can be implemented more precisely than would be possible if the tractor operator were required to make manual adjustments. Therefore, the end result of the methods may be better consistency of seed depth and crop growth. This may translate into higher crop yield and better return-on-investment for the farmer.

Additional non-limiting example embodiments of the disclosure are described below.

Embodiment 1: An agricultural implement comprising a row unit frame coupled to a draw bar by a height-adjustable mount, a set of opening discs coupled to the row unit frame such that the opening discs are vertically fixed relative to the row unit frame, and a biasing member configured to adjust a height of the row unit frame to maintain the opening discs in soil at a selected elevation relative to the draw bar.

Embodiment 2: The agricultural implement of Embodiment 1, further comprising a controller configured to adjust the biasing member.

Embodiment 3: The agricultural implement of Embodiment 1 or Embodiment 2, further comprising a sensor configured to measure a height of the draw bar relative to the soil surface.

Embodiment 4: The agricultural implement of any one of Embodiment 1 through Embodiment 3, further comprising a sensor configured to measure a height of the row unit frame relative to the soil surface.

Embodiment 5: The agricultural implement of any one of Embodiment 1 through Embodiment 4, further comprising a non-contact sensor configured to detect the soil surface, wherein the non-contact sensor is in communication with the controller.

Embodiment 6: The agricultural implement of Embodiment 5, wherein the non-contact sensor comprises a sensor following the opening discs.

Embodiment 7: The agricultural implement of Embodiment 5, wherein the non-contact sensor comprises a sensor leading the opening discs.

Embodiment 8: The agricultural implement of any one of Embodiment 1 through Embodiment 7, further comprising a set of firming wheels coupled to the row unit frame such that the firming wheels can travel vertically relative to the row unit frame.

Embodiment 9: The agricultural implement of Embodiment 8, wherein the firming wheels are arranged to close a trench formed by the opening discs in the soil surface.

Embodiment 10: The agricultural implement of any one of Embodiment 1 through Embodiment 9, wherein the biasing member comprises at least one member selected from the group consisting of a spring, a hydraulic actuator, a pneumatic actuator, and an electric actuator.

Embodiment 11: The agricultural implement of Embodiment 10, wherein the biasing member comprises a spring.

Embodiment 12: The agricultural implement any one of Embodiment 1 through Embodiment 11, wherein the set of opening discs is rotatably coupled to the row unit frame at a fixed point.

Embodiment 13: The agricultural implement any one of Embodiment 1 through Embodiment 13, further comprising a firming plate coupled to the row unit frame such that the firming plate can travel vertically relative to the row unit frame.

Embodiment 14: The agricultural implement any one of Embodiment 1 through Embodiment 13, wherein the row unit frame carries no gauge wheels.

Embodiment 15: A method of planting comprising selecting a depth of a trench to be formed in soil, and determining a height of a row unit frame relative to a surface of the soil. The row unit frame is coupled to a draw bar by a vertically adjustable mount, and the row unit frame carries a seed trench opening assembly. The method further comprises adjusting a height of the row unit frame relative to the draw bar to apply a force to push the seed trench opening assembly into the soil and form a trench therein. The height of the row unit frame relative to the draw bar is independent of a hardness of the soil.

Embodiment 16: The method of Embodiment 15, wherein adjusting a height of the row unit frame relative to the draw bar comprises maintaining the seed trench opening assembly at a selected elevation relative to the draw bar.

Embodiment 17: The method of Embodiment 15 or Embodiment 16, wherein adjusting a height of the row unit frame relative to the draw bar comprises controlling a depth of the seed trench.

Embodiment 18: The method of Embodiment 17, wherein adjusting the height of the row unit frame relative to the draw bar comprises controlling the depth of the seed trench without using a gauge wheel.

Embodiment 19: An agricultural implement comprising a toolbar, a row unit pivotally coupled to the toolbar, a sensor configured to measure a height of the toolbar relative to the ground surface and an actuator configured to adjust a height of the row unit relative to the toolbar. The row unit comprises a row unit frame, a seed trench opening assembly coupled to the row unit frame and configured to form a trench in a ground surface, a firming device disposed at a variable height relative to the row unit frame, and a seed delivery mechanism coupled to the row unit frame and configured to provide seeds to the trench. The actuator is configured to control a penetration depth of the seed trench opening assembly in the ground surface.

Embodiment 20: The agricultural implement of Embodiment 19, wherein the seed trench opening assembly is disposed at a fixed height relative to the row unit frame.

Embodiment 21: The agricultural implement of Embodiment 19 or Embodiment 20, wherein the firming device comprises a set of firming wheels.

Embodiment 22: The agricultural implement of any one Embodiment 19 through Embodiment 21, further comprising a biasing member connecting the firming device to the row unit frame.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various implement types and configurations.

What is claimed is:

1. An agricultural implement, comprising:

a row unit frame coupled to a draw bar by a height-adjustable mount;

a set of opening discs coupled to the row unit frame such that the opening discs are vertically fixed relative to the row unit frame;

an angle sensor configured to measure a rotation of a pivot arm relative to the draw bar, the pivot arm carrying a wheel configured to contact a soil surface; and a biasing member configured to adjust a height of the row unit frame to maintain the opening discs in soil at a selected elevation relative to the draw bar.

2. The agricultural implement of claim 1, further comprising a controller configured to adjust the biasing member.

3. The agricultural implement of claim 1, further comprising a set of firming wheels coupled to the row unit frame such that the firming wheels can travel vertically relative to the row unit frame.

4. The agricultural implement of claim 3, wherein the firming wheels are arranged to close a trench formed by the opening discs in the soil surface.

5. The agricultural implement of claim 1, wherein the biasing member comprises at least one member selected from the group consisting of a spring, a hydraulic actuator, a pneumatic actuator, and an electric actuator.

6. The agricultural implement of claim 5, wherein the biasing member comprises a spring.

7. The agricultural implement claim 1, wherein the set of opening discs is rotatably coupled to the row unit frame at a fixed point.

8. The agricultural implement claim 1, further comprising a firming plate coupled to the row unit frame such that the firming plate can travel vertically relative to the row unit frame.

9. The agricultural implement claim 1, wherein the row unit frame carries no gauge wheels.

10. The agricultural implement of claim 1, wherein the pivot arm is connected to the draw bar.

11. A method of planting, comprising:

selecting a depth of a trench to be formed in soil;

measuring a rotation of a pivot arm relative to a draw bar, the pivot arm carrying a wheel configured to contact a soil surface;

determining a height of a row unit frame relative to the soil surface based on the measured rotation of the pivot arm, the row unit frame coupled to the draw bar by a vertically adjustable mount and carrying a seed trench opening assembly; and adjusting a height of the row unit frame relative to the draw bar to apply a force to push the seed trench opening assembly into the soil and form a trench therein, wherein the height of the row unit frame relative to the draw bar is independent of a hardness of the soil.

12. The method of claim 11, wherein adjusting a height of the row unit frame relative to the draw bar comprises maintaining the seed trench opening assembly at a selected elevation relative to the draw bar.

13. The method of claim 11, wherein adjusting a height of the row unit frame relative to the draw bar comprises controlling a depth of the seed trench.

14. The method of claim 13, wherein adjusting the height of the row unit frame relative to the draw bar comprises controlling the depth of the seed trench without using a gauge wheel.

15. An agricultural implement, comprising:

a toolbar;

a row unit pivotally coupled to the toolbar, the row unit comprising:

a row unit frame;

a seed trench opening assembly coupled to the row unit frame and configured to form a trench in a ground surface;

a firming device disposed at a variable height relative to the row unit frame; and a seed delivery mechanism coupled to the row unit frame and configured to provide seeds to the trench;

an angle sensor configured to measure a rotation of a pivot arm relative to the toolbar to determine a height of the toolbar relative to the ground surface, the pivot arm carrying a wheel configured to contact the ground surface; and an actuator configured to adjust a height of the row unit relative to the toolbar to control a penetration depth of the seed trench opening assembly in the ground surface.

16. The agricultural implement of claim 15, wherein the seed trench opening assembly is disposed at a fixed height relative to the row unit frame.

17. The agricultural implement of claim 15, wherein the firming device comprises a set of firming wheels.

18. The agricultural implement of claim 15, further comprising a biasing member connecting the firming device to the row unit frame.

19. The agricultural implement of claim 15, wherein the pivot arm is connected to the toolbar.

20. An agricultural implement, comprising:

a row unit frame coupled to a draw bar by a height-adjustable mount;

a set of opening discs coupled to the row unit frame such that the opening discs are vertically fixed relative to the row unit frame;

an angle sensor configured to measure a rotation of a pivot arm relative to the row unit frame, the pivot arm carrying a wheel configured to contact a soil surface;

a non-contact depth sensor; and a biasing member configured to adjust a height of the row unit frame to maintain the opening discs in soil at a selected elevation relative to the draw bar.

21. The implement of claim 20, wherein the row unit frame carries no gauge wheels.

22. The implement of claim 20, wherein the seed trench opening assembly is disposed at a fixed height relative to the row unit frame.

* * * * *